United States Patent [19]
Giese

[11] 4,147,191
[45] Apr. 3, 1979

[54] TREE SHEARING APPARATUS

[76] Inventor: Everett I. Giese, P.O. Box 610, Prince George, British Columbia, Canada, V2L 4S8

[21] Appl. No.: 826,429

[22] Filed: Aug. 22, 1977

[51] Int. Cl.² .................................. A01G 23/08
[52] U.S. Cl. .................... 144/34 E; 144/3 D
[58] Field of Search ............. 144/2 Z, 3 D, 34 R, 144/34 E, 309 AC; 83/928

[56] References Cited

U.S. PATENT DOCUMENTS

| B 521,793 | 2/1976 | Bruun | 144/34 R |
|---|---|---|---|
| 2,955,631 | 10/1960 | Hoadley | 144/34 E |
| 3,074,447 | 1/1963 | Bombordier | 144/34 R |
| 3,528,468 | 9/1970 | Blonsky | 144/34 R X |
| 3,674,066 | 7/1972 | Shields | 144/34 E |
| 3,731,720 | 5/1973 | Moser et al. | 144/34 E |
| 3,747,651 | 7/1973 | Bangert et al. | 144/34 R |
| 3,805,860 | 4/1974 | Smith | 144/3 D |
| 3,850,469 | 11/1974 | Vit | 144/309 AC |
| 3,915,211 | 10/1975 | Barwise | 144/34 E |
| 3,927,704 | 12/1975 | Wirt | 144/34 E |
| 3,995,671 | 12/1976 | Wirt | 144/309 AC |
| 3,996,982 | 12/1976 | Oldenburg | 144/309 AC |
| 4,046,179 | 9/1977 | Crawford | 144/34 E |

*Primary Examiner*—Donald R. Schran
*Assistant Examiner*—W. D. Bray
*Attorney, Agent, or Firm*—Townsend and Townsend

[57] ABSTRACT

Apparatus for felling trees by shearing them off near ground level has a frame which supports, at its upper and lower ends respectively, tree holding and shearing mechanisms. The shearing mechanism includes a housing supporting a pair of shears which cut slightly downwardly as they are closed upon a tree by hydraulic devices. The hingedly mounted shears are supported in the housing by guides which initially keep the blades from drifting from their intended line of cut and subsequently transfer the weight of a cut tree sitting on the shear blades to the housing. A clamping arm is mounted on the frame to hold a tree against movement relative thereto during and immediately after the cutting operation.

6 Claims, 7 Drawing Figures

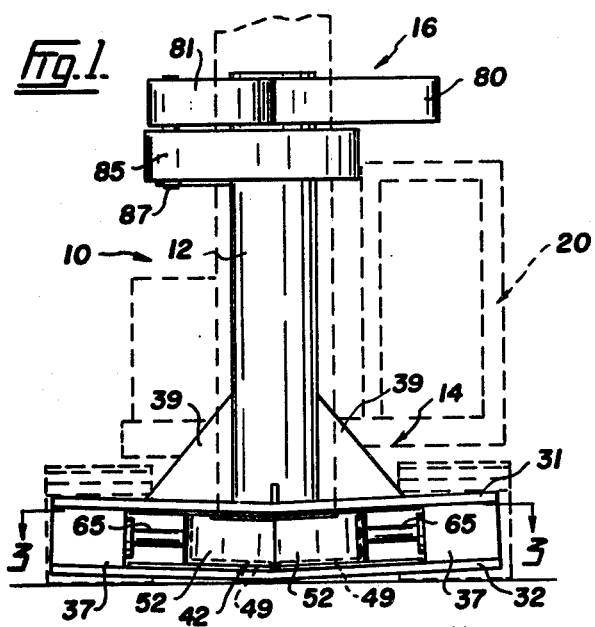
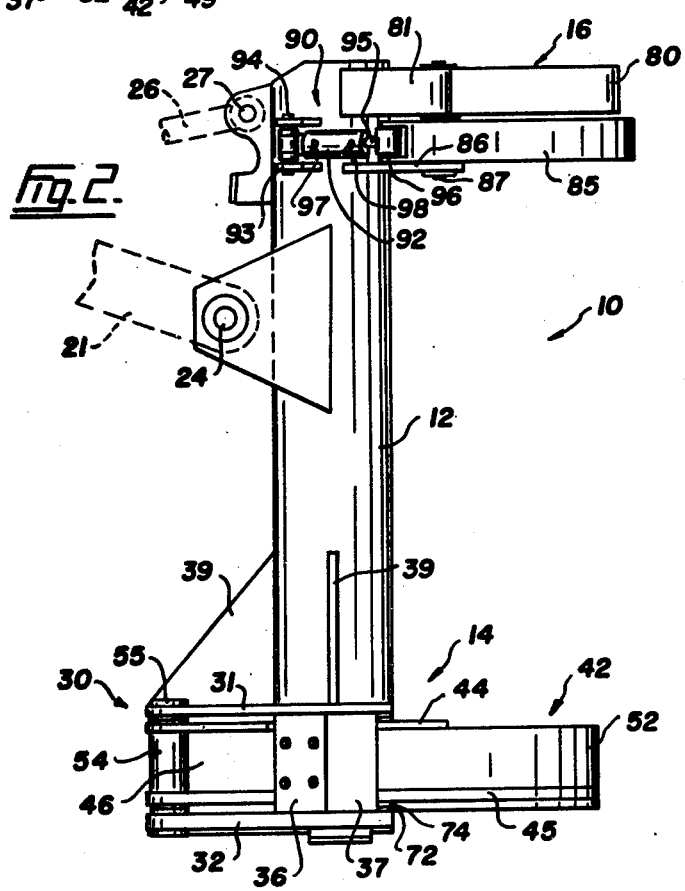

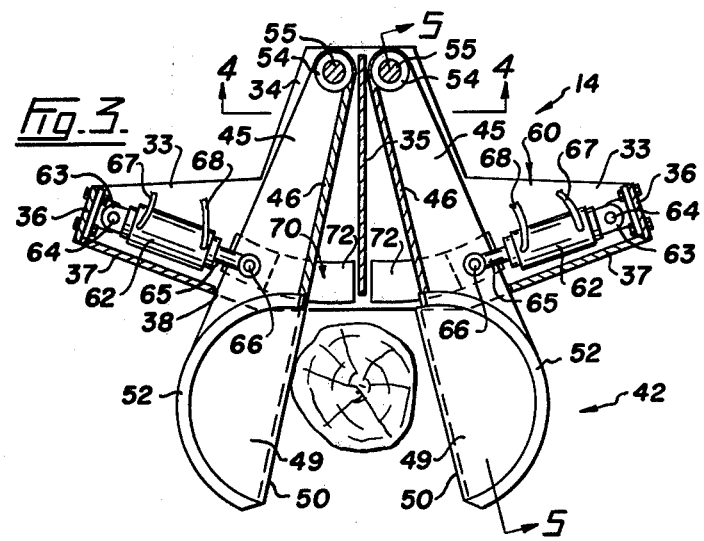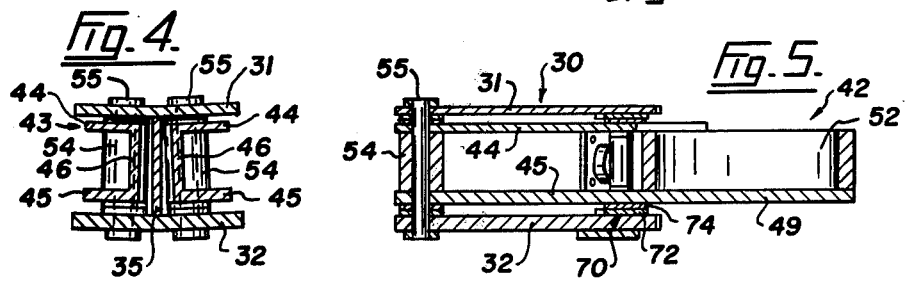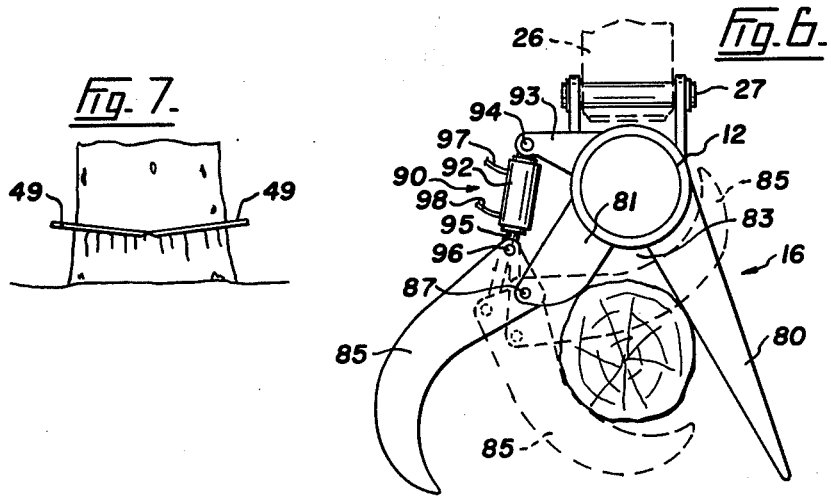

TREE SHEARING APPARATUS

SUMMARY OF THE INVENTION

This invention relates to an improved tree shearing apparatus for cutting off a standing tree near ground level.

The tree harvesting industry now employs a piece of equipment which has become widely known as the "feller buncher." As the name applies, this machine is capable of falling a tree and placing it on a pile to one side of the intended path of travel of the machine. Such a shear-equipped falling machine greatly increases productivity over that which can be achieved using manually-operated power chain saws and the like as well as the associated equipment needed to gather the falling trees at some convenient loading point in the woods. Some feller bunchers have been developed to cut trees which are fairly wide at the base, for example, up to thirty inches in diameter and, as a result the machines are not only costly to manufacture but are heavy and cumbersome to maneuver through the woods and their power requirements are correspondingly high. Another major disadvantage of many tree shears is their tendency to split or shatter the wood fibers immediately above the point where the shears bite through the base of the tree. This damages a valuable portion of the butt end of the tree and renders that portion at least unfit for future use as dressed lumber or veneer.

The tree shattering effect as well as other disadvantages of known shears are overcome by the present invention which provides a tree cutting assembly the weight and power requirements of which are kept at a desirably low level without limiting the apparatus to only relatively small diameter trees. The twin shearing blades are supported in a sturdily-constructed housing and are angled in such a way that any wood fibers which are shattered during the cutting operation are mainly located in the stump rather than in the butt end of the cut tree as has previously been the case. The shear blades cooperate with tree guiding and holding arms which enable the present machine to align itself to some extent with a standing tree so that this important step in the tree felling operation is not so time consuming as has hitherto been the case.

In order to achieve these objects, a machine according to the present invention may be defined as a tree shearing apparatus which comprises a main frame adapted to be placed in a generally upright position alongside a standing tree, a housing at a lower end of the main frame, said housing being shaped to provide side portions projecting laterally of the main frame and a rear portion, a pair of shears mounted in the housing, said pair of shears including elongated inner members and opposing shear blades projecting forwardly of the housing, hinge means connecting rearmost ends of the elongated inner members to the rear portion, guide means between the elongated inner members and the side portions near the shear blades arranged to transfer to the side portions a major portion of the weight of a cut tree resting on said closed shear blades, and power means mounted in the side portions and connected to the elongated inner members near the shear blades for operating the pair of shears to cut through the standing tree near ground level.

In the drawings which illustrate a preferred embodiment of the invention,

FIG. 1 is front elevation of a tree shearing apparatus constructed in accordance with the present invention, FIG. 2 is a side elevation of the apparatus, FIG. 3 is a horizontal section taken on the line 3—3 of FIG. 1 and showing details of a shear assembly of the apparatus, FIG. 4 is a vertical section taken on the line 4—4 of FIG. 3, FIG. 5 is a vertical section taken on the line 5—5 of FIG. 3, FIG. 6 is a plan of the apparatus showing tree folding means therefor, and FIG. 7 is a schematic view showing a tree being cut by the present apparatus.

Referring to the drawings, the numeral 10 indicates generally tree shearing apparatus constructed in accordance with the present invention. This apparatus comprises a sturdily constructed main frame 12 which preferably is a length of heavy gauge pipe. A shear assembly 14 is provided at the bottom of the elongated frame and tree holding means 16 extends forwardly from the top of the frame.

FIG. 1 shows the apparatus 10 mounted on a track-equipped tractor 20 for movement through the woods so that standing trees can be sheared off close to the ground by the assembly 14 while being held by the means 16. In FIG. 2, the numeral 21 indicates the forward end of a boom which is mounted on the tractor 20 to carry the present apparatus. A pivotal connection 24 attaches the apparatus to the boom end. The tractor is also provided with a hydraulically operated ram 26 which is pivotally secured to frame 12 as at 27. Thus, the apparatus can be tilted as required about the horizontal and transversely extending axis provided by the pivotal connection 24. The apparatus 10 can also be rotated about the longitudinal axis of the boom 21 so that a tree cut and subsequently supported by the apparatus can be placed on the ground.

The shear assembly 14 comprises a housing 30 constructed of heavy guage top and bottom plates 31 and 32. These plates are both shaped to appear in plan as shown in FIG. 3, thus providing the housing with laterally projecting side portions 33 and a rearwardly projecting portion 34. The side and rear portions 33 and 34 of the housing form a generally T-shaped configuration at the bottom of the tubular frame 12. A center wall 35 extends between the plates 31 and 32 as shown best in FIGS. 3 and 4. End walls 36, and front walls 37 which adjoin those end walls, interconnect the top and bottom plates of the housing 30. The opposing side edges of the front wall 37 are spaced apart to define with the top and bottom plates, a rectangular front opening 38. Triangular gussets 39 (FIGS. 1 and 2) additionally secure the housing 30 to the lower part of the main frame 12.

This type of box-like construction provides a housing which has a very low weight-to-strength ratio as is so desirable in a feller buncher. There are no large projections on the underside of the housing so that the assembly 14 can be operated almost at ground level to shear through the base of a tree. It will be noticed in FIG. 1 and in FIG. 4 that the side portions 33 are upwardly inclined from the centre wall 35 of the frame. The angle or inclination amounts to only a few degrees but is exaggerated in the drawings for purposes of illustration.

The housing 30 supports a pair of shears indicated by the numeral 42. These shears are mounted in the housing to project forwardly through the front opening 38. As shown best in FIGS. 3 and 4, each shear 42 has a heavily constructed and channel-like inner member 43 formed of upper and lower flanges 44 and 45 connected by a web 46. Supported on the lower flanges 45 are outer blades 49 which have cutting edges 50 substantially aligned with the webs 46. Each shear blade 42 is bordered by a substantially semi-circular tree support 52 which is also secured to the top flange 44. The small or rearmost end of each shear member 43 is provided with a sleeve bearing 54, see FIGS. 3 and 4, and a hinge pin 55 carried by the corresponding end of the rear portion 34 of the housing extends through this sleeve bearing.

Thus, the pair of shears 42 are mounted to swing between the closed position shown in FIG. 1 and the open position shown in FIG. 3. The hinge pins 55 are inclined from the vertical as shown in FIG. 4 and so as to conform to the inclination (FIG. 1) of the side portion 33 of the housing. When the shears are closed, the blades 49 slope upwardly from their cutting edges 50 as indicated by the dotted lines appearing in FIG. 1. This arrangement enables the blades to cut in a slightly downwardly direction as they are closed upon a tree. The hinge pins 55, it will be noticed, are widely spaced from the cutting edges 50 so that those edges are moving substantially parallel to one another as they approach the closed position of the shear blades.

The pair of shears 42 are opened and closed by power means generally indicated at 60. As shown best in FIG. 3, the means 60 for each shear comprises a hydraulic cylinder 62 the closed end of which is secured to a bearing 63 fastened to the adjacent end wall 36 by a pivot pin 64. The double acting cylinder 62 is fitted with a piston rod 65 secured to the adjacent shear by another pivot pin 66. The pins 66 are located close to the blades 49 and as far as possible from the hinge pins 55 so that the means 60 can exert a maximum force upon the shear blades as they snip through a tree. Hose lines 67 and 68 forming part of a suitable hydraulic circuit (not otherwise shown) connect opposite ends of each cylinder 62 to a source of hydraulic power aboard the tractor 20. The hydraulic cylinders are protected by the sturdily constructed housing and the hose lines to the cylinders extend upwardly through the hollow frame 12 thence along the boom 21 so that they to are protected from damage to a large extent. The hydraulic circuit, of course, includes a single control valve for operation by the driver of the vehicle so that the shears can be opened and closed in unison.

The pair of shears 42, when they are actuated to shear a tree steadied by the tree holding means 16, are required to support the major part of the weight of tree and therefore it is important that the shears in turn be properly supported and guided within the housing 30. For this purpose the tree shearing apparatus 10 is provided with guide means generally indicated at 70. FIGS. 3, 4 and 5 show the means 70 as comprising bearing strips 72 which are secured to the opposing faces of the top and bottom plates 31 and 32. The upper and lower faces of the pair of shears 42 are fitted with wear pads 74 having sliding contact with the bearing strips 72. Thus, the pair of shears 42 are fully supported during the opening and closing movements and the hinge pins 62 are relieved of major portions of any loads imposed upon the shears during and immediately after a tree cutting operation.

Referring now to FIGS. 1, 2 and 6, the tree holding means 16 will be seen to comprise long and short tree guiding arms 80 and 81 respectively. These two guide arms project forwardly from the upper end of the main frame 12 and are angularly disposed to one another, see FIG. 6, so as to define a V-shaped seat 83. A curved clamping arm 85 is secured by a pivot pin 87 between the outer end of the short guide arm 81 and a bracket 86 projecting from the main frame 12. Thus, the arm 85 is mounted to swing towards and away from the long guide arm 80 as well as parallel thereto.

Clamping arm 85 is operated to clamp a tree within the seat 83 by power means generally indicated at 90. This means 90 comprises a double acting hydraulic cylinder 92 which is pivotally secured to a bracket 93 projecting from the frame 12 by a pin 94. A piston rod 95 mounted in the cylinder 92 is secured to the arm 85 by a pivot pin 96. Opposite ends of the cylinder 92 are fitted with hose lines 97 and 98, these lines forming part of a suitable hydraulic circuit extending to a pressure source aboard the tractor 20. The circuit is not shown in the drawings apart from the hose lines 97 and 98 but will be understood to include a control valve for the operator of the tractor whereby a tree can be clamped and released as will now be described.

In operation, the tree shearing apparatus 10 is driven up to a tree to be cut with the pair of shears 42 fully open and the clamping arm 85 spaced a maximum distance from the long guide arm 80. The driver of the tractor 20 moves his machine forward and normally he uses the arm 80 to guide the tree into the seat 83. As the tree is seated, the base of the tree is straddled by the wide-open shear blades and is contacted by the front of the housing to bring a halt to further forward movement. Cylinder 92 is then pressurized to swing the arm 85 against the tree thereby clamping it within the seat 83 and, in most instances, to the front edge of the housing 30. The tractor may be operating on sloping ground, or for other reasons, the tree may not be perpendicular to the ground surface so that the driver could have difficulty in placing the apparatus 10 in cutting position particularly since his vision is partly obscured by the apparatus itself. However, the guide arms 80 and 81 plus the initially wide-open clamping arm 85 aid the driver in positioning the apparatus and so does the pair of shears 42. These shears are capable of opening much wider than the diameter of the largest tree to be cut which may be 30 inches or so near ground level. Only one cutting edge may be in contact with a side of the tree but, once the clamping arm 85 grips the tree and the blades start to cut, the apparatus aligns itself with the tree without assistance from the driver.

Pressure is fed to the power means 60 to start the blades into their cut, the blade encountering the least resistance advancing furthest until both blades are doing a substantially equal amount of cutting. The cutting action of the blades is as shown in exaggerated form in FIG. 7 with the blades slicing downwardly and inwardly to meet at approximately the center of the tree. As the blades 49 close, they exert a wedging force which tends to shatter the wood fibers on the stump side of the cut rather than on the butt end of the cut tree. The pair of shears 42 are rigidly constructed as previously mentioned so that there is little tendency for them to flex as a cut is made. Furthermore, the guide means 70 supports the blades so that they do not drift during a cut and this too enable the shear blades to cut cleanly without shattering the butt end and with minimum amount of power being required. The spacing between the hinge pins 55 and the cutting edges 50 is such that those edges move almost into parallelism during a major portion of the shearing action. For this reason, the apparatus 10 does not force itself off the tree as sometimes occurs with conventional feller bunchers.

At the completion of the shearing action, the cut tree sits on the closed blades 49 while still being clamped by the arm 85. The butt end of the overbalanced tree is prevented for slipping off the blade by the supports 52. The tractor and its boom can then be maneuvered and manipulated to swing the cut tree to one side and place it in a substantially horizontal position prior to lowering it to the ground. The weight of the tree cut by the present invention in some cases will exceed 12,000 lbs. and most of this weight is carried by the pair of shears. The guide means 70, however, supports the pair of shears and transfers the weight to the housing so that relatively little of the load need by taken by the hinge pins 55.

From the foregoing, it will apparent the present shearing apparatus can be operated to quickly and easily harvest trees which may vary in diameter and be growing from uneven ground. The self aligning action of the apparatus accounts for some of this high productivity since little time is wasted in repositioning the assembly 14 and the means 16 once the apparatus has been place upright against a tree selected for cutting. Also the support given to the shear blades by the guide means 70, and the sturdily constructed housing 30, ensures that almost all the available power is utilized to close the blades rather than in overcoming the resistance which would be encountered if the blades were allowed to drift during a cut.

I claim:

1. Tree shearing apparatus comprising a main frame adapted to be placed in a generally upright position alongside a standing tree, a housing at a lower end of the main frame, said housing being shaped to provide side portions projecting laterally of the main frame and a rear portion, a pair of shears mounted in the housing, said pair of shears including elongated inner members and opposing shear blades projecting forwardly of the housing, hinge means connecting rearmost ends of the elongated inner members to the rear portion, guide means carried by the side portions for guiding the shear blades and for transferring to said side portions a major portion of the weight of a cut tree resting on said shear blades when in a closed position, said pair of shears being disposed relative to one another whereby the shear blades when closed are inclined upwardly from cutting edges thereof, and power means mounted in the side portions and connected to the elongated inner members near the shear blades for operating the pair of shears to cut through a standing tree near ground level.

2. Tree shearing apparatus as claimed in claim 1, and including tree holding means mounted near an upper end of the main frame, and power means for operating the tree holding means.

3. Tree shearing apparatus as claimed in claim 2, in which said tree holding means comprises a short and a long arm fixedly secured to the main frame to provide a tree-receiving seat, a curved clamping arm swingingly mounted on the short arm, said power means operating to swing the curved clamping arm to hold the tree within the seat.

4. Tree shearing apparatus as claimed in claim 1, in which said pair of shear blades are each bordered by a substantially semi-circular support for enclosing the butt end of a cut tree resting on said closed shear blades.

5. Tree shearing apparatus comprising a frame adapted to be placed in a generally upright position alongside a standing tree, a housing at the lower end of the main frame, said housing having top and bottom plates shaped to provide the housing with side portions projecting laterally of the main frame, and a rear portion; a pair of shears mounted between the top and bottom plates, said pair of shears including elongated inner members and opposing shear blades projecting forwardly of the housing, hinge means connecting rearmost ends of the elongated inner members to the rear portion, guide means for the pair of shear blades, said guide means being located proximate said shear blades and interposed between the elongated inner members and the top plate and the bottom plate, respectively, said hinge means and said guide means being angularly disposed relative to vertical and horizontal planes respectively and supporting the pair of shears whereby the shear blades when closed are inclined upwardly from cutting edges thereof, power means mounted in the side portions and connected to the elongated inner members near the shear blades for opening and closing the pair of shears, tree holding means on an upper end of the main frame, and power means connected thereto for operating the tree holding means.

6. Tree shearing apparatus as claimed in claim 5, in which said tree holding means comprises a short and a long arm fixedly secured to the main frame to provide a tree-receiving seat, a curved clamping arm swingingly mounted on the short arm, said power means operating to swing the curve clamping arm to hold the tree within the seat.

* * * * *